Dec. 22, 1931.  C. W. CARTIER  1,837,356
REPAIR VULCANIZER
Filed May 14, 1928

INVENTOR.
CHARLES W. CARTIER
BY
ATTORNEY.

Patented Dec. 22, 1931

1,837,356

UNITED STATES PATENT OFFICE

CHARLES W. CARTIER, OF CHICOPEE, MASSACHUSETTS, ASSIGNOR TO THE FISK RUBBER COMPANY, OF CHICOPEE FALLS, MASSACHUSETTS, A CORPORATION OF MASSACHUSETTS

REPAIR VULCANIZER

Application filed May 14, 1928. Serial No. 277,419.

My invention relates to an apparatus for repair vulcanizing. In the past repair vulcanizers have been built but their flexibility has been limited due to the necessity of pulling down a large portion of the apparatus when changing over the vulcanizer from one size of form to another.

One object of my invention is to provide an apparatus of simple construction that may be easily and quickly operated. Another object of the invention is the provision of easily interchangeable mold sections. Other objects will appear in the following specification and claims.

Referring to the drawings showing one embodiment of my invention and, for the purpose of illustration, using a pneumatic tire casing as the article being repaired:

Figures 3, 4:
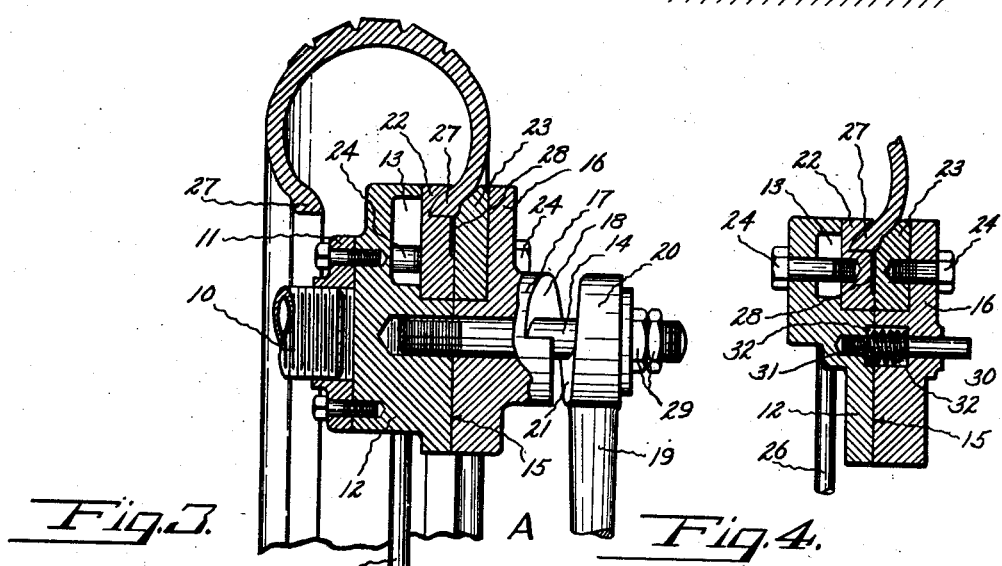
Fig. 3 is a view taken substantially on line 3—3 of Fig. 2 and showing, in cross-section, a tire having its bead section vulcanized.
Fig. 4 is a similar view taken on line 4—4 of Fig. 2.

The apparatus made in accordance with my invention, as shown in the drawings, is of the double type being capable of vulcanizing two tires at the same time although each tire has its bead adjusted in its mold section separately. The vulcanizer consists of a frame or pedestal 10 supporting vulcanizing units A and B. As these units are similar only unit A will be described, like character numbers indicating like parts on the two units. The unit is fixed to the pedestal 10 by means of a flange 11. A body member 12, fastened to the flange 11 and provided with a recess 13 carries a stud 14 projecting from the face 15 of the member 12. This stud is adapted to carry a slidable member 16 having a boss 17 on which is formed a spiral cam face 18. A lever 19 pivoted on the stud 14 is fastened to or made integral with a cam 20 having a spiral cam face 21 adaptable to co-act with the cam face 18. A pair of plates 22 and 23, grooved to present when brought together in aligned relationship a mold adapted to form a tire bead, are fastened to the members 12 and 16 by means of screws 24. As shown especially in Figs. 3 and 4, plate 22 entirely covers the recess and, together with that recess, forms a cavity through which heat in the form of steam or hot water may be sent by pipes 25 into the cavity and out through exhaust pipes 26. Acting as one of the sides of the cavity, the plate 22 will become hot and cause a bead 27, being held between the mold plates, to become vulcanized. A portion 28 of the plate 22 may be cut away to allow any surplus rubber to flow away from the bead during vulcanization, the fin thus caused being trimmed off after vulcanization.

To form a perfect bead the plates 22 and 23 must press tightly together. Such pressure is effected by the two cam faces 17 and 21 acting on each other and is accomplished by a single partial rotation of the lever 19 (approximately 180°). As the cam faces wear due to their use, adjustment nuts 29 acting on the cam 20 on stud 14 may be regulated.

In order to insure perfect alignment of the two members 12 and 16, a pair of studs 30 are fixed to the member 12 and are adapted to have the member 16 slide on them. Springs 31 on the studs 30 will cause the members 12 and 16 to move away from each other unless they are held together by the action of the cam 20. The two members 12 and 16 are recessed at 32 sufficiently to prevent the springs from binding when the members are brought together.

Figures 1, 2:
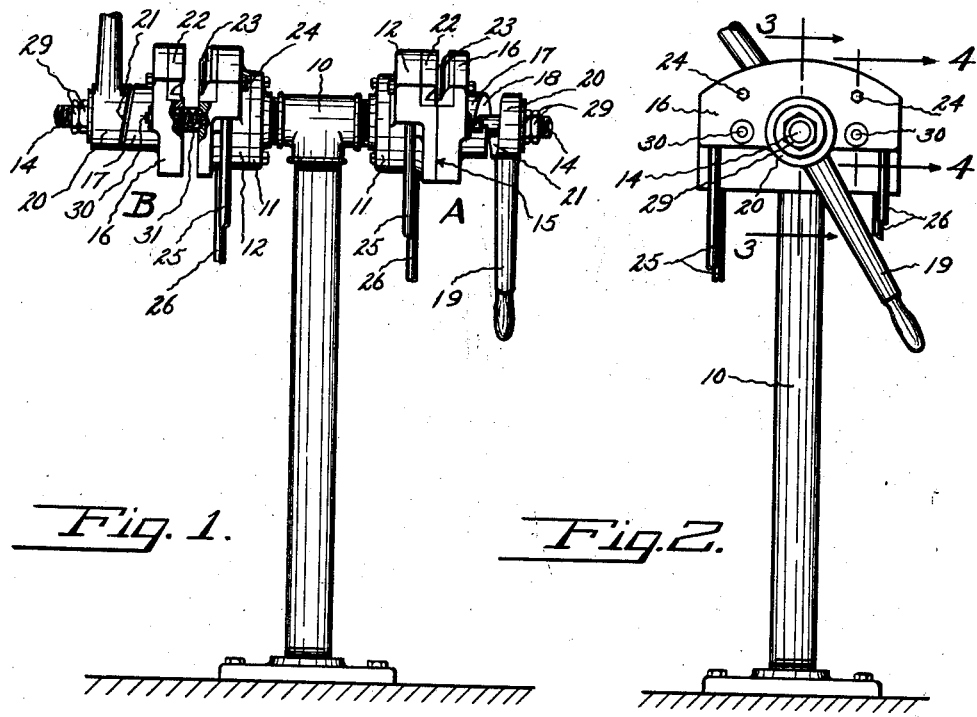
Fig. 1 is a front elevation of the apparatus.
Fig. 2 is a side view looking in at the right of Fig. 1.
Figure 5:
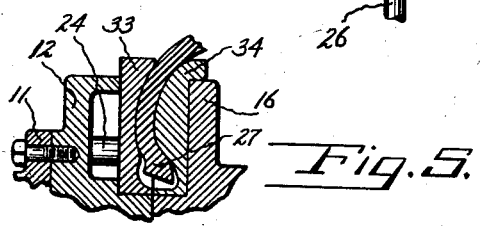
Fig. 5 is a partial view similar to Fig. 3, but showing a portion of a side wall of a tire being vulcanized.

In Fig. 1 I have shown unit A in closed or locked position and unit B in open or unlocked position. It will be noticed that the fixed member 12 is the only one provided with a heating chamber. As shown in unit A the inner surface and the bottom of the bead 27 only are the portions heated or vulcanized. If, however, it is found desirable to vulcanize the outer portion of the bead instead, the plates 22 and 23 may be reversed as in unit B so that the plate 23 will form the closing side of the heating cavity. With slight alteration, that is, by providing the slidable member 16 with a recess similar to the recess 13 and attaching a flexible pipe to the member, the entire surface of the bead 27 may be vulcanized. As an example of a modified form of mold plates, I have shown in Fig. 5 plates used in curing the side wall of a tire without curing the bead portion. By relieving the bead portion of the mold, the side wall of the tire will get all the pressure exerted by the vulcanizer. Referring especially to this figure mold plates 33 and 34 having portions 35 relieved to accommodate the bead 27 of a tire are fixed in place on the members 12 and 16. In like manner mold plates of other forms could be used in the vulcanizer.

In the drawings I have shown the vulcanizer used only in connection with the repair of portions of pneumatic tires but it will be understood that the apparatus may be used for repairing other articles. It will also be understood that although the steam cavity has been shown in the fixed member of the vulcanizer, this cavity could be easily associated with the movable member or in both members at the same time, this depending somewhat on the kind of repair needed.

Having thus described my invention, I claim:

1. A repair vulcanizer comprising a pair of segmental mold plates, a fixed member having a recess adapted to be formed into a chamber by one of said mold plates, a rigid stud projecting from said fixed member, a movable member slidably supported on said stud adapted to carry the other mold plate, and a cam member mounted on the free end of the stud adapted to advance the movable member and the mold plate carried thereby into closed relation with the fixed member and its mold plate.

2. A repair vulcanizer comprising a pair of segmental mold plates, a fixed member having a recess adapted to be formed into a chamber by one of said mold plates, a rigid stud projecting from said fixed member, a movable member slidably supported on said stud adapted to carry the other mold plate, means to releasably secure said mold plates respectively to said fixed and movable members, and a cam member mounted on the free end of the stud adapted to advance the movable member and the mold plate carried thereby into closed relation with the fixed member and its mold plate.

3. A repair vulcanizer comprising a pair of segmental mold plates, a fixed member having a recess adapted to be formed into a chamber by one of said mold plates, a rigid stud projecting from said fixed member, a movable member slidably supported on said stud adapted to carry the other mold plate, a cam member mounted on the free end of the stud adapted to advance the movable member and the mold plate carried thereby into closed relation with the fixed member and its mold plate and means to maintain the movable member in parallel alignment with the fixed member as it is moved along the stud.

4. A repair vulcanizer comprising a pair of segmental mold plates, a fixed member having a recess adapted to be formed into a chamber by one of said mold plates, a rigid stud projecting from the fixed member, a movable member slidably supported on the stud adapted to carry the other mold plate, means to normally maintain the slidable member in spaced parallel relation with the fixed member, and a cam member mounted on the free end of the stud adapted to advance the movable member and the mold plate carried thereby into closed relation with the fixed member and its mold plate.

5. A repair vulcanizer comprising a pair of segmental mold plates, a fixed member having a recess adapted to be formed into a chamber by one of said mold plates, a rigid stud projecting from the fixed member, a movable member slidably supported on said stud adapted to carry the other mold plate, a cam member mounted on the free end of the stud adapted to advance the movable member and the mold plate carried thereby into closed relation with the fixed member and its mold plate, means to maintain the movable member in parallel alignment with the fixed member as it is moved along the stud and spring means associated with the aligning means to normally maintain the slidable member spaced from the fixed member.

6. A repair vulcanizer comprising a pair of segmental mold plates, a fixed member having a recess adapted to be formed into a chamber by one of said mold plates, a rigid stud projecting from said fixed member, a movable member, slidably supported on said stud, adapted to carry the other mold plate and being provided on its outer face with a fixed spiral cam, and a second spiral cam rotatably mounted on the free end of the stud adapted to co-operate with the fixed cam to advance the movable member and the mold plate carried thereby into closed relation with the fixed member and its mold plate.

7. A repair vulcanizer comprising a pair of segmental mold plates, a fixed member having a recess adapted to be formed into a chamber by one of said mold plates, a rigid stud projecting from said fixed member, a movable member, slidably supported on said stud, adapted to carry the other mold plate and being provided on its outer face with a fixed spiral cam, a second spiral cam rotatably mounted on the free end of the stud adapted to cooperate with the fixed cam to advance the movable member and the mold plate carried thereby into closed relation with the fixed member and its mold plate, means to maintain the movable member in parallel alignment with the fixed member as it is moved along the stud and spring means associated with the aligning means to normally maintain the slidable member spaced from the fixed member.

CHARLES W. CARTIER.